(12) United States Patent
Viswanathan et al.

(10) Patent No.: US 10,976,829 B1
(45) Date of Patent: Apr. 13, 2021

(54) SYSTEMS AND METHODS FOR DISPLAYING AUGMENTED-REALITY OBJECTS

(71) Applicant: Facebook, Inc., Menlo Park, CA (US)

(72) Inventors: Srinidhi Viswanathan, Mountain View, CA (US); Wai-Ho Li, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/430,388

(22) Filed: Jun. 3, 2019

(51) Int. Cl.
| | |
|---|---|
| *G06F 3/01* | (2006.01) |
| *G06N 20/00* | (2019.01) |
| *G06T 19/00* | (2011.01) |
| *G06T 7/70* | (2017.01) |

(52) U.S. Cl.
CPC .............. *G06F 3/017* (2013.01); *G06F 3/011* (2013.01); *G06N 20/00* (2019.01); *G06T 7/70* (2017.01); *G06T 19/006* (2013.01)

(58) Field of Classification Search
CPC ........ G06F 3/017; G06F 3/011; G06T 19/006; G06T 7/70; G06N 20/00
See application file for complete search history.

(56) References Cited

U.S. PATENT DOCUMENTS

| 9,165,318 | B1 * | 10/2015 | Pauley | G06Q 30/0643 |
| 2017/0124410 | A1 * | 5/2017 | Cho | G06K 9/00362 |
| 2018/0024641 | A1 * | 1/2018 | Mao | G06K 9/00389 |
| | | | | 382/103 |
| 2019/0333262 | A1 * | 10/2019 | Chen | G06F 3/013 |

OTHER PUBLICATIONS

"GrowRing", URL: http://growring.co/, as accessed on Jan. 18, 2019, pp. 1-5.

* cited by examiner

*Primary Examiner* — Amit Chatly
(74) *Attorney, Agent, or Firm* — FisherBroyles, LLP

(57) ABSTRACT

A computer-implemented method for displaying augmented-reality objects may include capturing, by an augmented-reality system, an image of a user's hand. The method may also include applying a machine learning model to the image to identify a set of key points and determine a gesture of the hand based on the key points. In addition, the method may include identifying a targeted area of the image containing a portion of a finger based on the key points and the gesture and, subsequently, detecting a pair of edge contours of the finger by performing a computer vision method on the targeted area. Furthermore, the method may include extrapolating a location to place an augmented-reality object on the finger. Finally, the method may include displaying, by the augmented-reality system, the augmented-reality object at the location on the finger by tracking the key points. Various other methods, systems, and computer-readable media are also disclosed.

20 Claims, 10 Drawing Sheets

SYSTEMS AND METHODS FOR DISPLAYING AUGMENTED-REALITY OBJECTS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
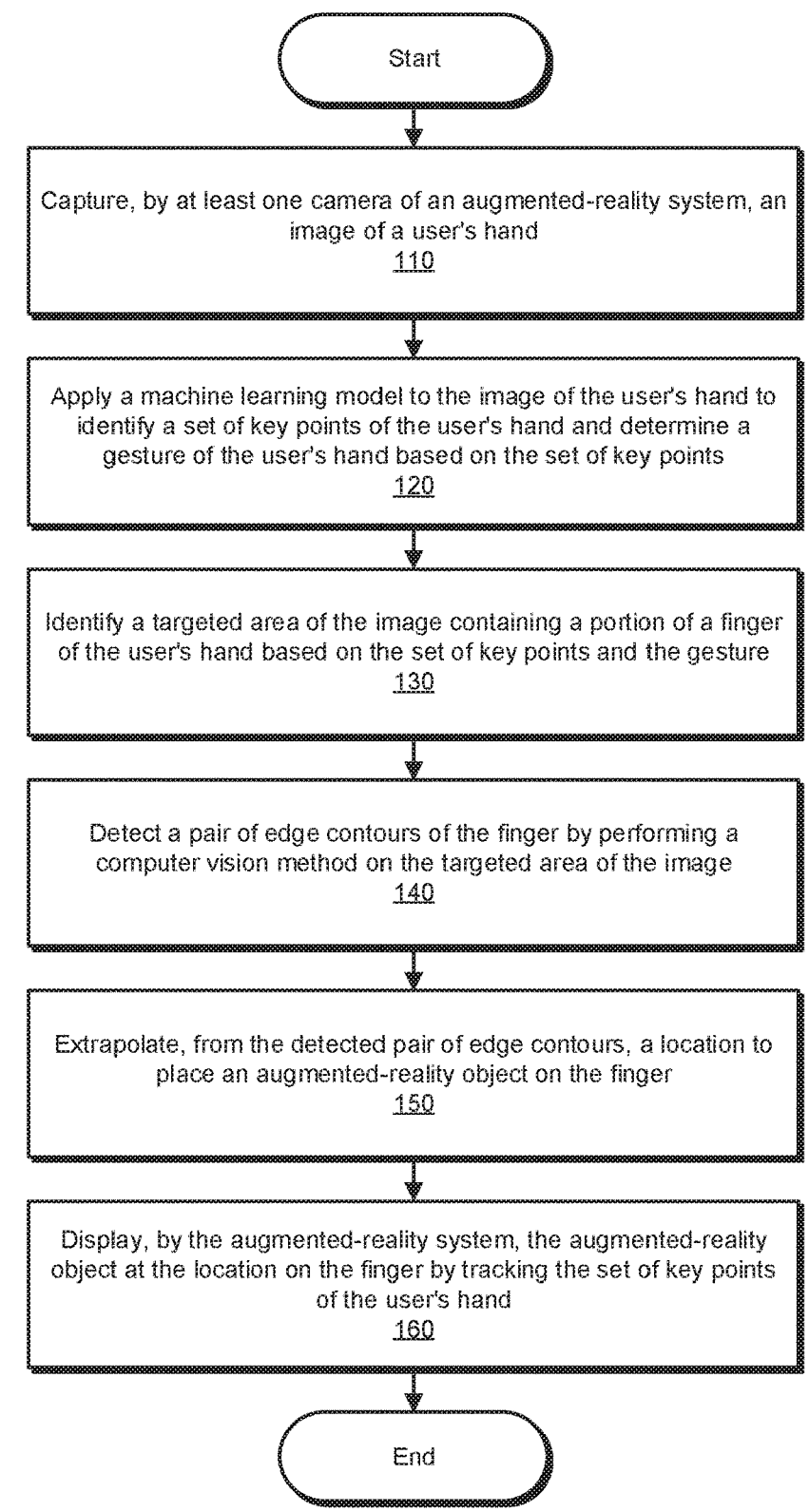
FIG. 1 is a flow diagram of an exemplary method for displaying augmented-reality objects.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Augmented-reality systems allow users to experience digital features within a real-world environment, often enhanced so that the digital features interact with the real-world environment. For example, sounds may be digitally enhanced or created to play in conjunction with real-world ambience. In other examples, users may use digital screens or displays to view digital constructs in the context of real-world images. For instance, a user may digitally try on clothing and accessories without needing to physically wear them.

To enhance user experiences, augmented reality often requires digital constructs to match and react to the real world in real time. For example, when a user tries on a digital shirt, the shirt may visually move to match the user's movements so that the user can see it from different angles. When digital constructs do not accurately adjust to real-world differences, such as differences in body sizes or differences in angles and positions, users may notice these discrepancies and may experience a disconnect with the augmented-reality system. In order to make these adjustments more accurate, some augmented-reality systems may use complex calculations to ensure the digital constructs match the real-world environment. However, these complex calculations may require a long time to process, resulting in substantial lag time when displayed to the user. Traditional methods may be limited by computational complexity to two-dimensional rendering of digital objects. Therefore, better methods of quickly computing changing real-world images in real time are needed to improve the synchronization of augmented-reality objects with the real-world environment.

The present disclosure is generally directed to systems and methods for displaying augmented-reality objects. As will be explained in greater detail below, embodiments of the present disclosure may use a camera of an augmented-reality system to capture visual data for a structure of interest, such as a user's hand. The disclosed systems and methods may first train a machine learning method with various images of hands to create a base model for comparison. For example, the disclosed systems and methods may identify key points on the user's hand and match these key points to the base model to determine a gesture of the user's hand. By identifying a specific targeted area where an augmented-reality object may be placed, the disclosed systems and methods may focus a computer vision method on the targeted area to define the relevant portion of the hand from important key points in the area. The disclosed systems and methods may then extrapolate a more precise location to place the augmented-reality object, such as determining the portion of a finger to place a ring. Additionally, the disclosed systems and methods may continue to track the key points of the user's hand, even as the user moves the hand or the focus of the image changes, such that the augmented-reality system may accurately display and orient the object on the user's hand. The disclosed systems and methods may utilize these key points to match the user's hand with an expected model for improved tracking of the user's hand and, therefore, improved accuracy of displaying augmented-reality objects.

In addition, the systems and methods described herein may improve the functioning of a computing device, such as an augmented-reality device, by combining machine learning models with computer vision techniques to improve the speed and accuracy of calculating the orientation of an augmented-reality object. These systems and methods may also improve the fields of augmented and artificial reality by improving the tracking of a user's hand using image data and key points and by reducing the need for additional wearable trackers or devices. Thus, the disclosed systems and methods may improve the robustness of matching augmented-reality assets with real-world features.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
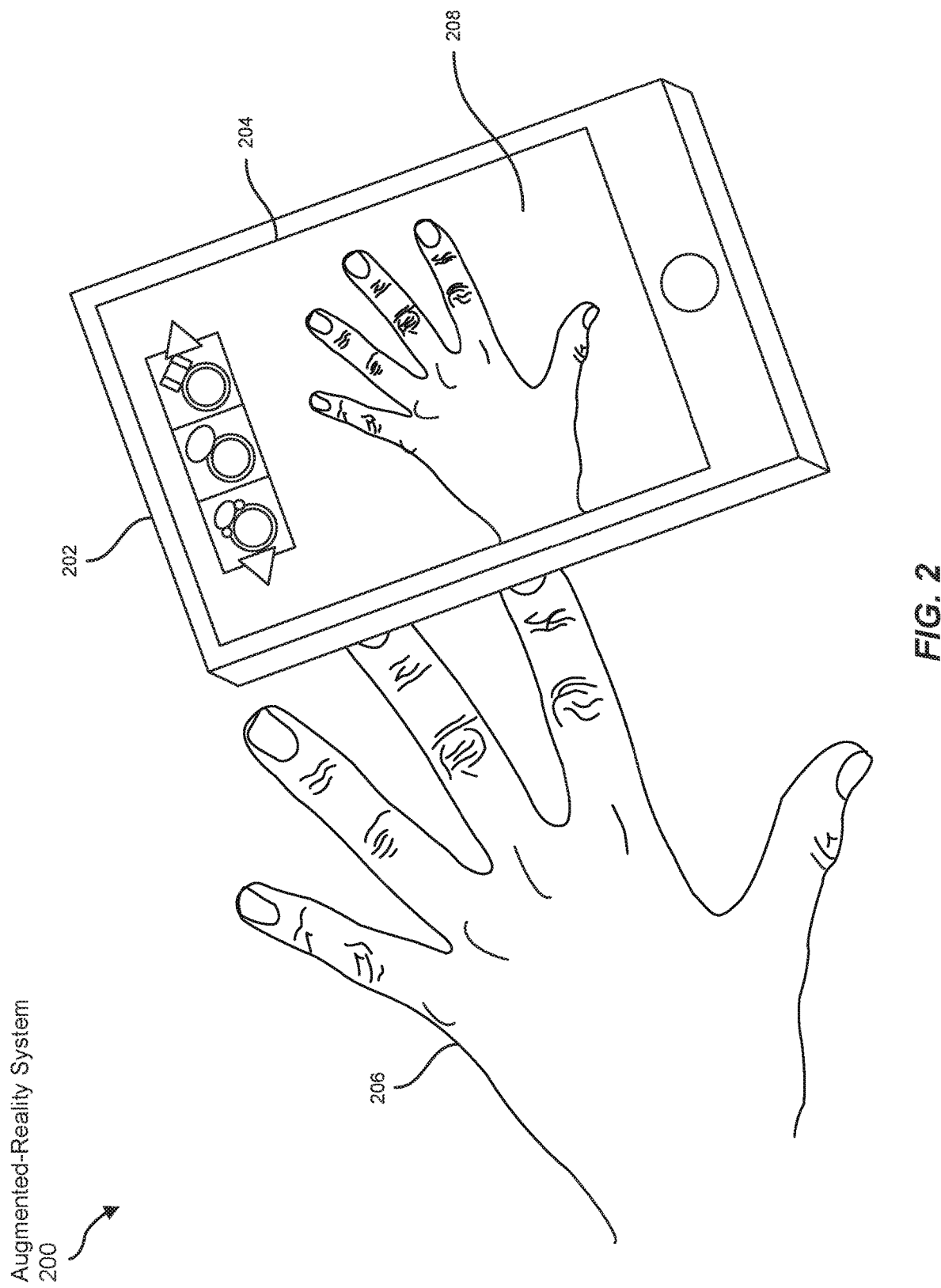
FIG. 2 illustrates the use of an exemplary augmented-reality system.

The following will provide, with reference to FIG. 1, detailed descriptions of computer-implemented methods for displaying augmented-reality objects. Detailed descriptions of an exemplary usage of an exemplary augmented-reality system will be provided in connection with FIGS. 2-3. In addition, detailed descriptions of an exemplary matching of an exemplary base model to an exemplary user's hand will be provided in connection with FIGS. 4-5. Detailed descriptions of an exemplary computer vision method to identify an exemplary location to place an augmented-reality object will be provided in connection with FIGS. 6-7. Furthermore, detailed descriptions of an exemplary display of an exemplary augmented-reality object will be provided in connection with FIG. 8. Finally, detailed descriptions of an exemplary augmented-reality system analyzing image data to display the exemplary augmented-reality object will be provided in connection with FIGS. 9-10.

Embodiments of the present disclosure may include or be implemented in conjunction with an augmented-reality system. Augmented or artificial reality (AR) is a form of reality that has been adjusted in some manner before presentation to a user, which may include, e.g., a virtual reality (VR), a mixed reality (MR), a hybrid reality, or some combination and/or derivatives thereof. Augmented-reality content may include generated content combined with captured (e.g., real-world) content. The augmented-reality content may include video, audio, haptic feedback, or some combination thereof, any of which may be presented in a single channel or in multiple channels (such as stereo video that produces a three-dimensional effect to the viewer). Additionally, in some embodiments, augmented reality may also be associated with applications, products, accessories, services, or some combination thereof, that are used to, e.g., create content in an augmented reality and/or are otherwise used in (e.g., perform activities in) an augmented reality. The augmented-reality system that provides the augmented-reality content may be implemented on various platforms, including a head-mounted display (HMD) connected to a host computer system, a standalone HMD, a mobile device or computing system, or any other hardware platform capable of providing artificial reality content to one or more viewers.

FIG. 1 is a flow diagram of an exemplary computer-implemented method 100 for displaying augmented-reality objects. The steps shown in FIG. 1 may be performed by any suitable computer-executable code and/or computing system, including augmented-reality system 200 illustrated in FIG. 9. In one example, each of the steps shown in FIG. 1 may represent an algorithm whose structure includes and/or is represented by multiple sub-steps, examples of which will be provided in greater detail below.

Figure 9:
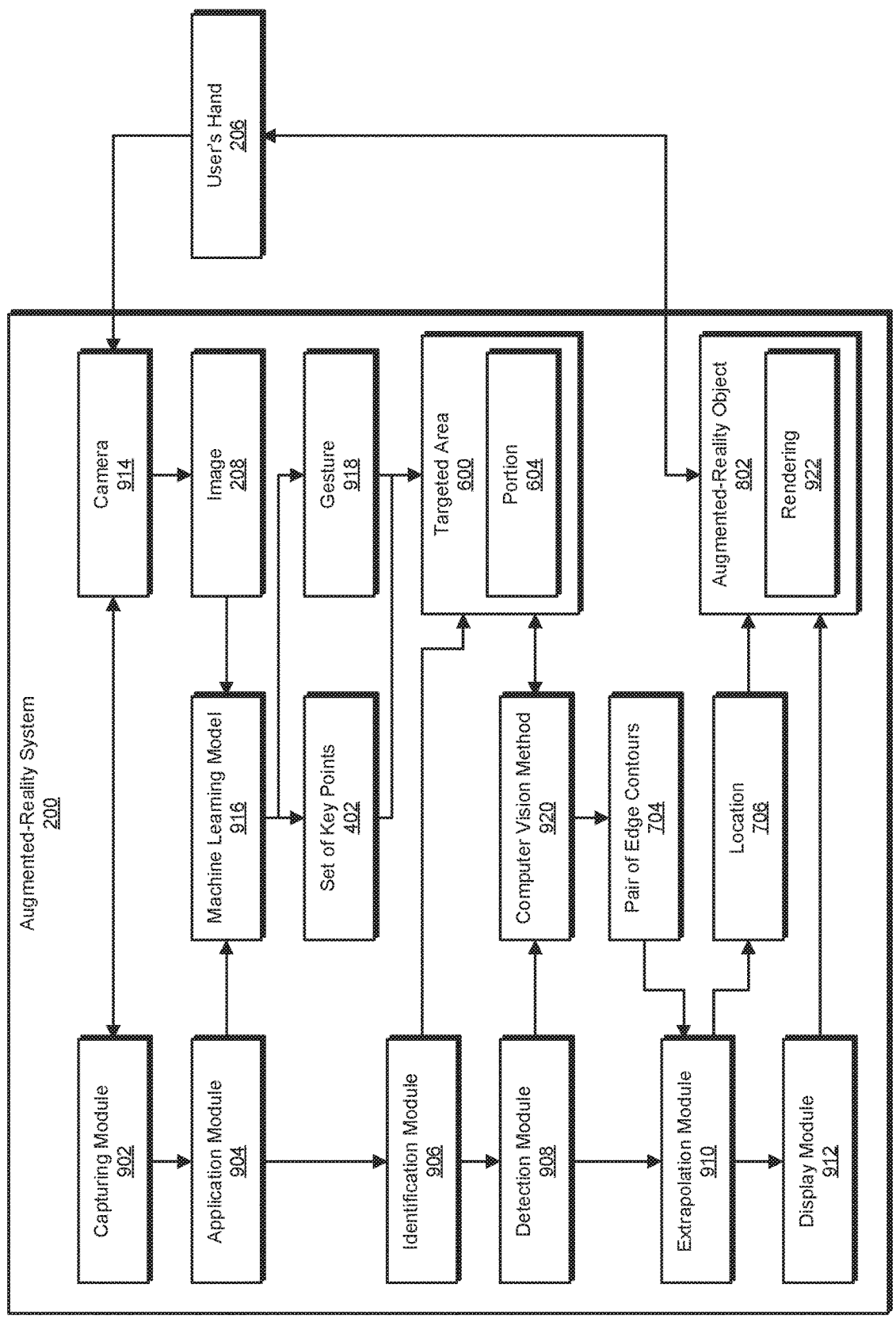
FIG. 9 is a block diagram of an exemplary augmented-reality system for displaying augmented-reality objects.

As illustrated in FIG. 1, at step 110, one or more of the systems described herein may capture, by one or more cameras of an augmented-reality system, an image of a user's hand. For example, FIG. 9 is a block diagram of an exemplary augmented-reality system 200 for displaying augmented-reality objects. As illustrated in FIG. 9, a capturing module 902 may, as part of augmented-reality system 200, capture, by a camera 914, an image 208 of a user's hand 206.

The systems described herein may perform step 110 in a variety of ways. For example, augmented-reality system 200 of FIG. 9 may include a mobile computing device, such as mobile computing device 202 illustrated in FIG. 2, camera 914, and/or a visual display 204. Additionally or alternatively, augmented-reality system 200 may include other virtual reality and peripheral devices, such as VR or AR glasses, a headset, integrated camera and screen systems, smart devices, additional computing devices, and/or additional screens, that may provide visual information to a user. Furthermore, augmented-reality system 200 may execute augmented-reality software applications, such as an advertisement that uses augmented reality to display products.

In one embodiment, image 208 of user's hand 206 may include one or more still images and/or videos. For example, image 208 of FIG. 2 may capture a single photographic image of user's hand 206 or a continuous video of user's hand 206 for some length of time. Additionally or alternatively, image 208 may represent a real-time image or video of user's hand 206.

Returning to FIG. 1, at step 120, one or more of the systems described herein may apply a machine learning model to the image of the user's hand to identify a set of key points of the user's hand and determine a gesture of the user's hand based on the set of key points. For example, an application module 904 may, as part of augmented-reality system 200 in FIG. 9, apply a machine learning model 916 to image 208 of user's hand 206 to identify a set of key points 402 and determine a gesture 918 based on set of key points 402.

The systems described herein may perform step 120 in a variety of ways. In some embodiments, the term "machine learning" may refer to a computational algorithm that may learn from data in order to make predictions. Examples of machine learning may include, without limitation, support vector machines, neural networks, clustering, decision trees, regression analysis, classification, variations or combinations of one or more of the same, and/or any other suitable supervised, semi-supervised, or unsupervised methods.

Figure 10:
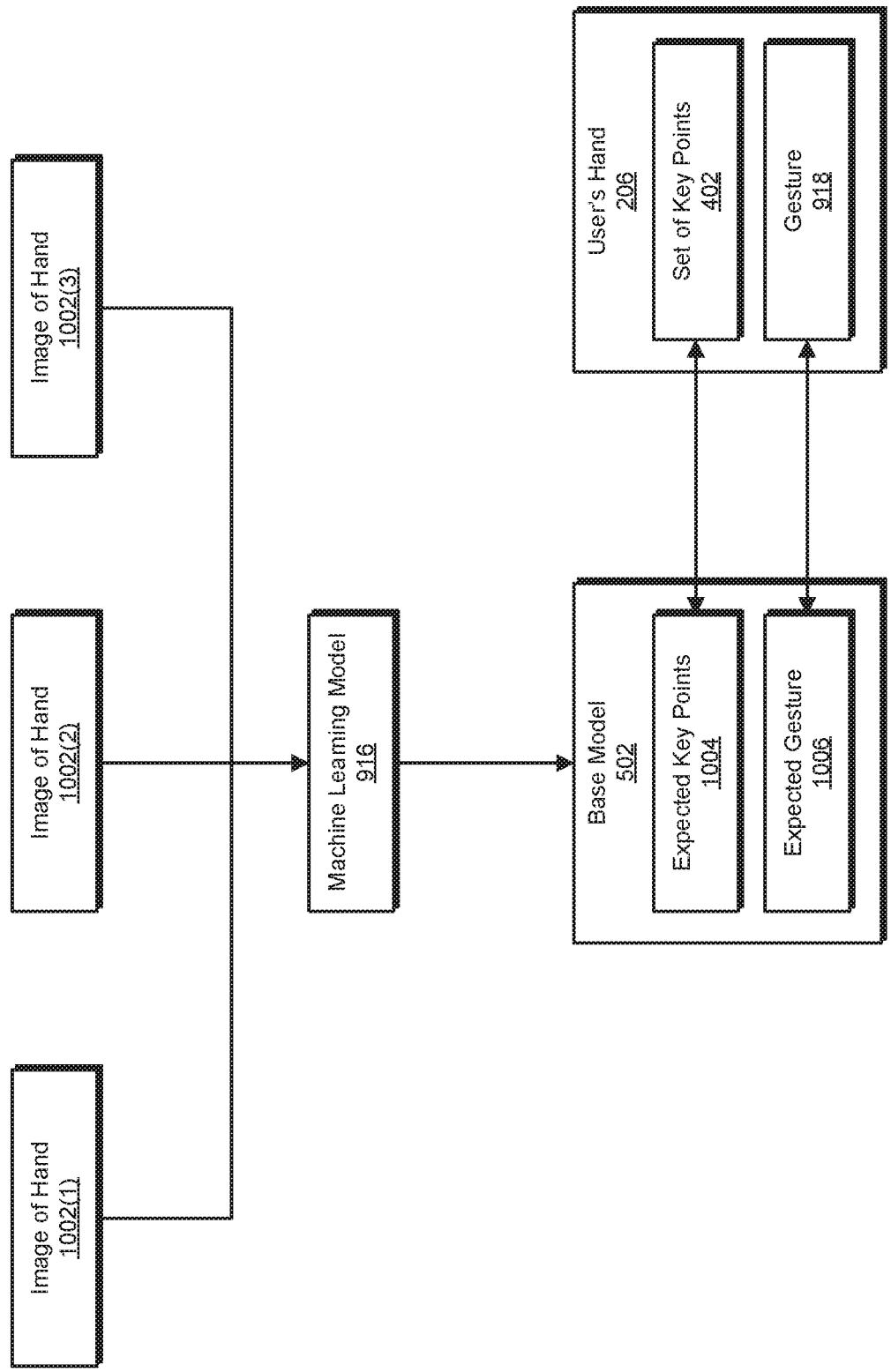
FIG. 10 is a block diagram of an exemplary machine learning model trained to create the base model to compare with the gesture of the user's hand.

In some examples, application module 904 may apply machine learning model 916 to identify set of key points 402 by training machine learning model 916 using a set of images of hands to create a base model. For example, as shown in FIG. 10, image of hand 1002(1), image of hand 1002(2), and image of hand 1002(3) may train machine learning model 916 to create a base model 502. In other examples, multiple images of the same hand and/or images of multiple hands may be used to train machine learning model 916 to detect a variety of hands and/or gestures.

Figure 4:
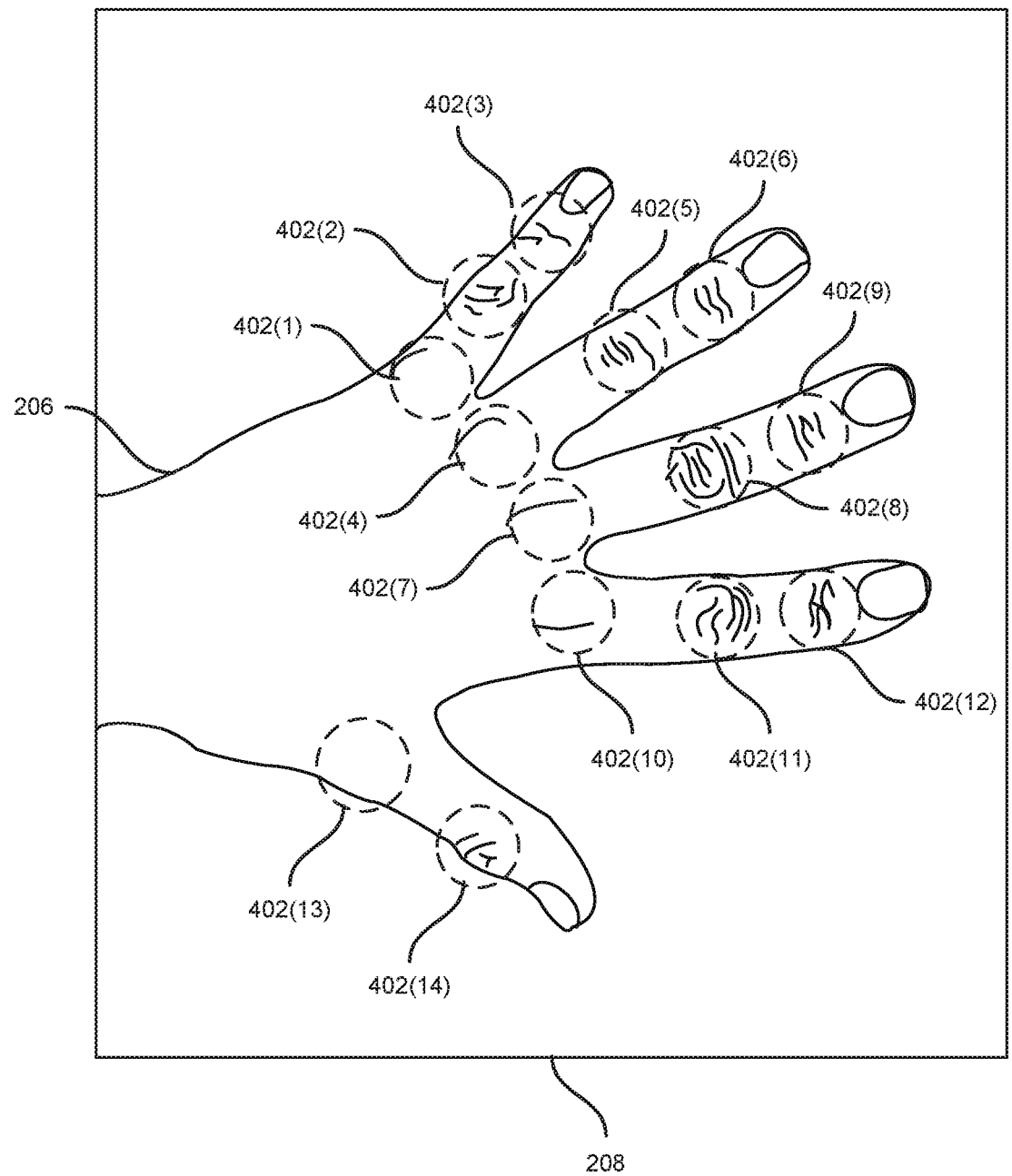
FIG. 4 illustrates an exemplary identification of exemplary key points on an exemplary image of the user's hand.

As shown in FIG. 4, key points 402(1)-(14) may be identified on user's hand 206. In this example, key points 402(1)-(14) may represent some of the joints and/or knuckles of fingers on user's hand 206. For example, key points 402(2)-(3), 402(5)-(6), 402(8)-(9), and 402(11)-(12) may be selected due to the top joints of fingers being more stable and/or having less variation between users than other parts of user's hand 206. In other examples, set of key points 402 may represent other important structural elements such as finger tips, wrists, nails, or any other construct that may be detected and tracked in image 208.

Figure 5:
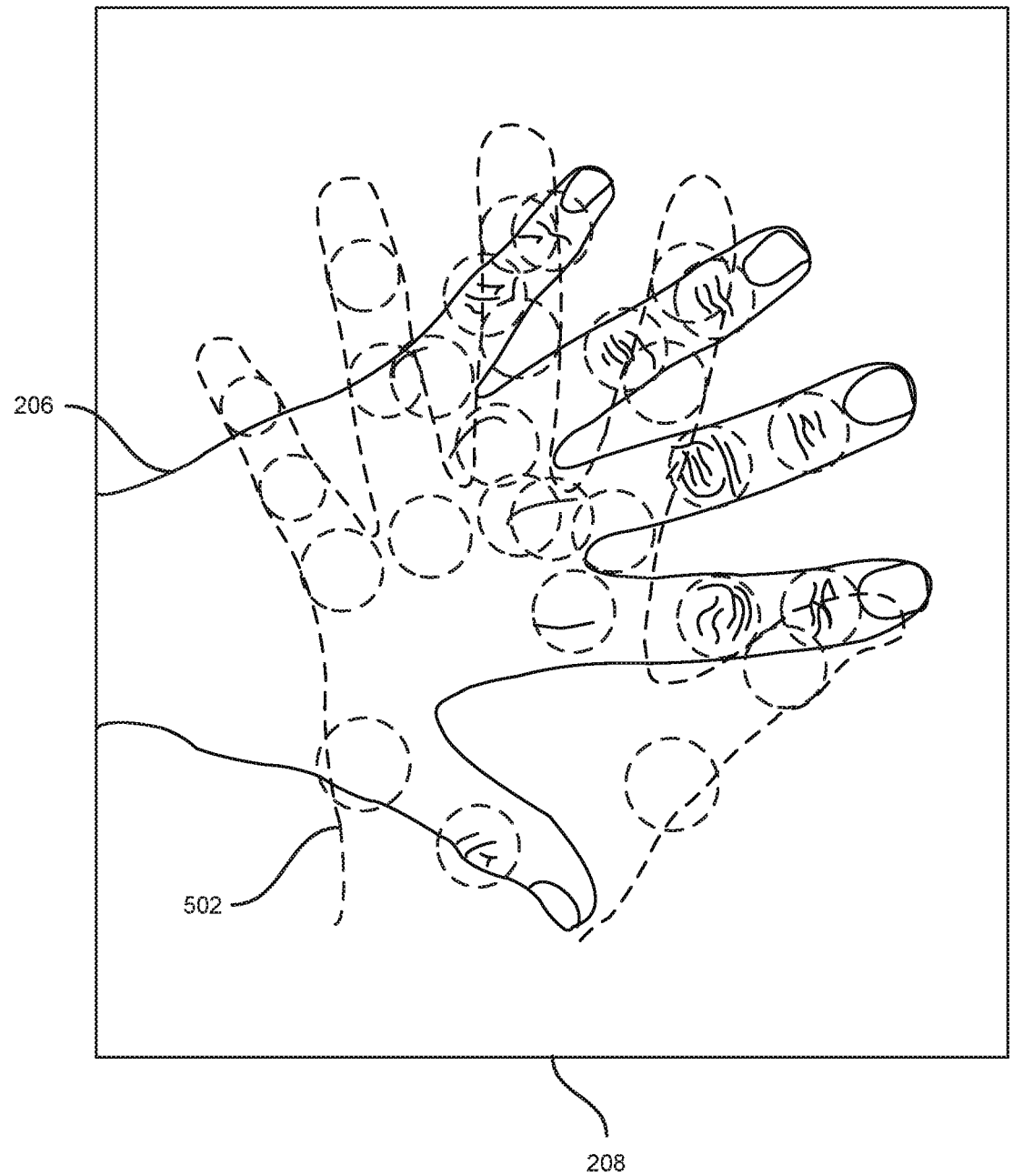
FIG. 5 illustrates an exemplary attempt to match an exemplary base model to the image of the user's hand.
Figure 6:
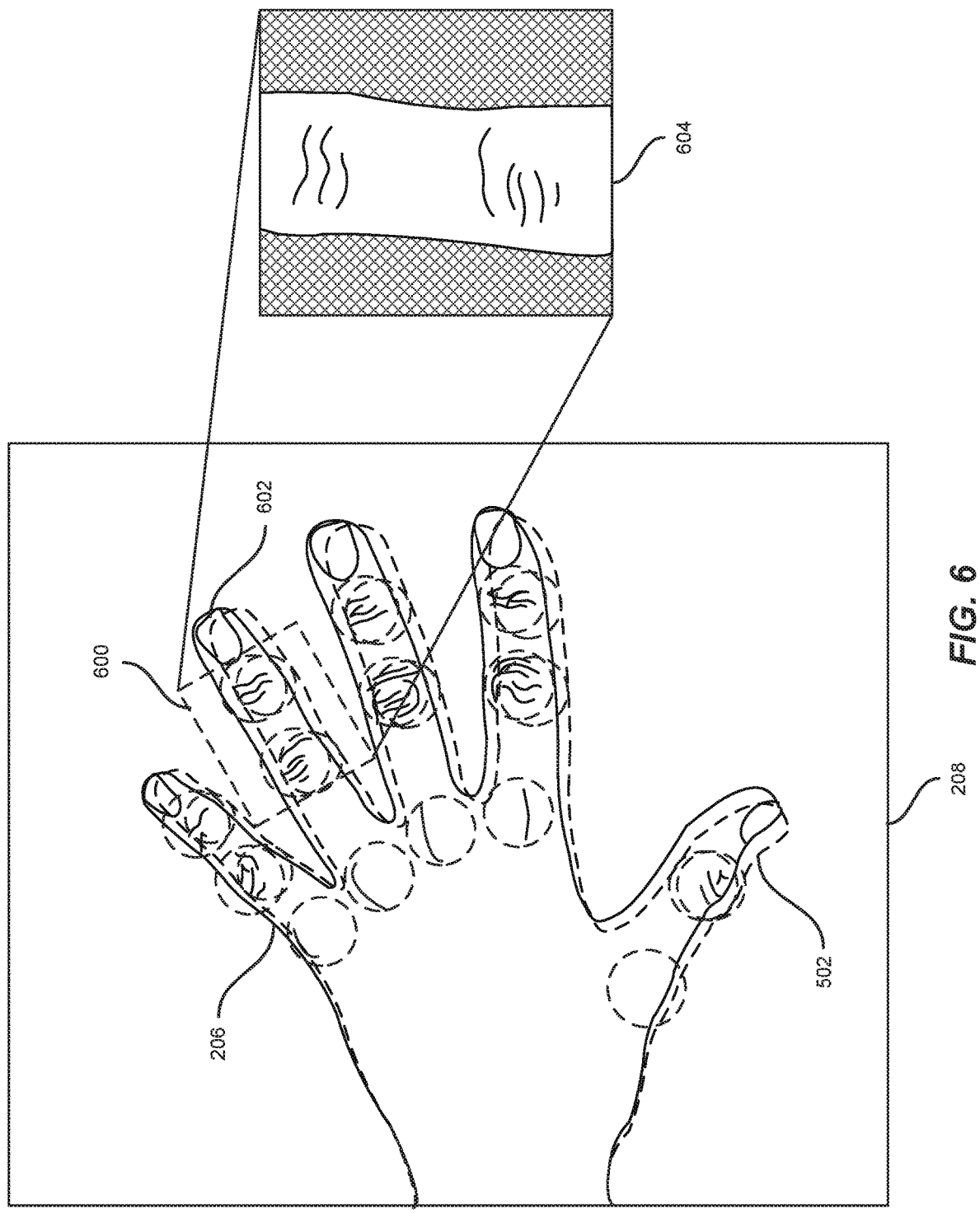
FIG. 6 illustrates an exemplary match of the base model and an exemplary identification of an exemplary targeted area of the user's hand.

In some embodiments, application module 904 may apply machine learning model 916 to determine gesture 918 of user's hand 206 by rotating base model 502 to match user's hand 206. In these embodiments, application module 904 may then apply machine learning model 916 to match set of key points 402 to base model 502. As illustrated in FIG. 5, base model 502 may be applied to image 208 and rotated in an attempt to match user's hand 206. As illustrated in FIG. 6, the resulting rotation may match set of key points 402 on base model 502 to similar set of key points 402 on user's hand 206. Furthermore, although illustrated as a still image as part of image 208, gesture 918 may alternatively represent a motion captured by video, and application module 904 may track the movement of set of key points 402 to match a movement of base model 502.

In some examples, application module 904 may apply machine learning model 916 to image 208 by detecting that gesture 918 of user's hand 206 does not meet a predetermined threshold for an expected gesture and prompting, by augmented-reality system 200, the user to position user's hand 206 in the expected gesture. In these examples, machine learning model 916 may apply set of key points 402 to user's hand 206 and determine relative positions of set of key points 402 to detect gesture 918. For example, as shown in FIG. 10, machine learning model 916 may compare base model 502, which includes expected key points 1004 and an expected gesture 1006, to user's hand 206 with set of key points 402 and detected gesture 918. By applying expected key points 1004 to user's hand 206, machine learning model 916 may determine whether the positions of set of key points 402 on user's hand 206 is within the predetermined threshold for matching set of key points 402 on base model 502. Alternatively, machine learning model 916 may determine whether gesture 918 matches expected gesture 1006 within an acceptable range, which may account for differences in hand shapes and sizes.

Additionally or alternatively, machine learning model 916 may determine expected gesture 1006 independently of set of key points 402. For example, machine learning model 916 may compare detected gesture 918 with expected gesture 1006 and, subsequently, compare set of key points 402 with expected key points 1004 to verify that the locations of a user's fingers remain in the correct positions for gesture 918. In other examples, machine learning model 916 may use expected key points 1004 to confirm gesture 918 of user's hand 206 and/or use expected gesture 1006 to confirm set of key points 402.

Figure 3:
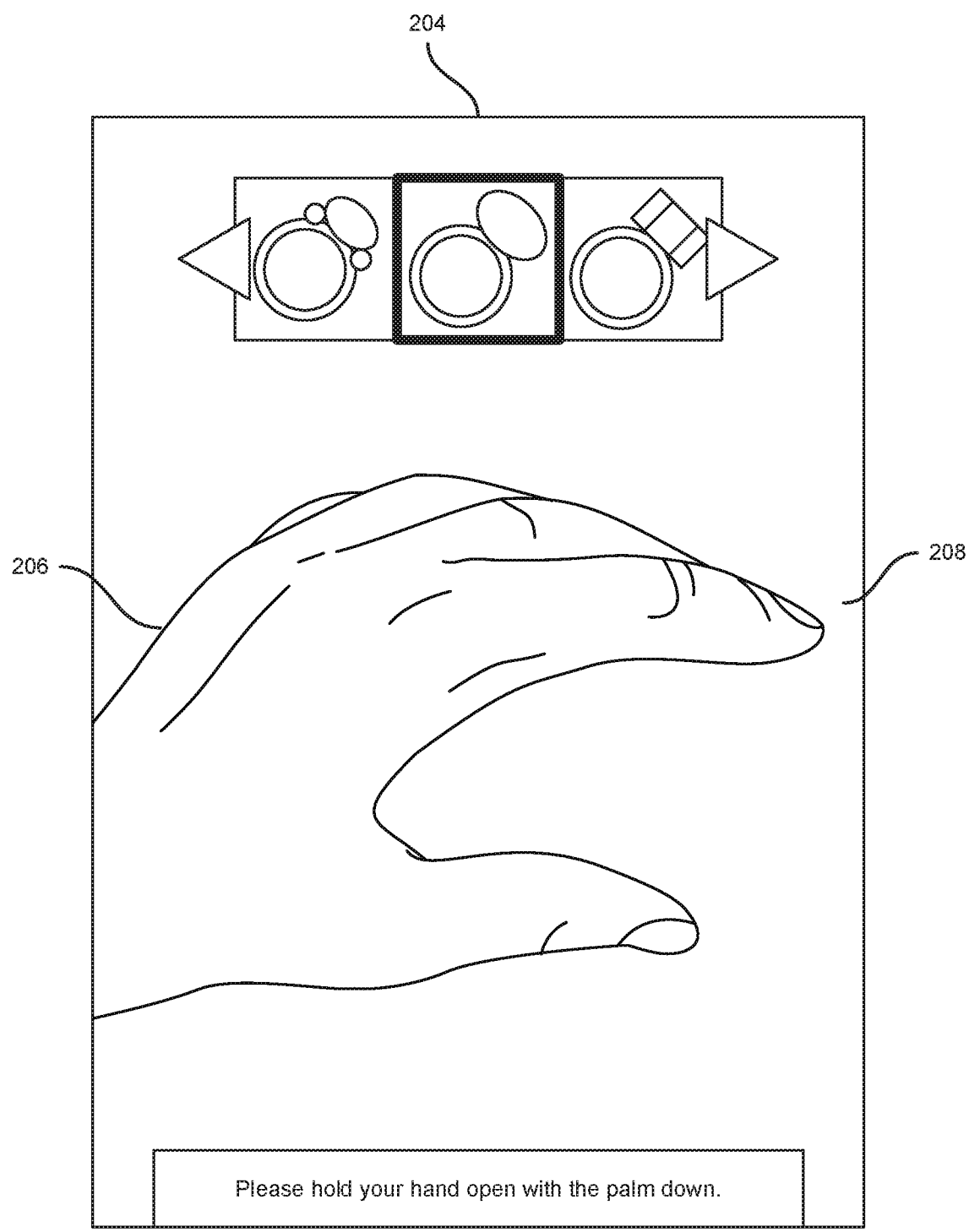
FIG. 3 illustrates an exemplary prompt to produce an exemplary gesture of a user's hand.

In one example, as illustrated in FIG. 3, machine learning model 916 may be trained using open hand poses, and user's hand 206 may represent an unrecognized pose. In this example, visual display 204 may display a text message to prompt the user to use a specific gesture. In other embodiments, visual display 204 may display a video or other instructional graphics to prompt the user. Additionally or alternatively, visual display 204 may display expected gesture 1006, such as by using a silhouette, to prompt the user, and/or augmented-reality system 200 may play an audio message prompt. As another example, application module 904 may determine user's hand 206 represents an open hand gesture but the open hand gesture may be at a different angle than expected gesture 1006. In this example, application module 904 may prompt the user to change the angle of gesture 918. Additionally or alternatively, machine learning model 916 may be trained using other poses, such as the pose of FIG. 3 to try on rings. In this example, machine learning model 916 may recognize gesture 918 of FIG. 3 and continue without prompting the user.

In one embodiment, machine learning model 916 may determine that gesture 918 is similar to expected gesture 1006 and/or that set of key points 402 is similar to expected key points 1004 and may perform the rotation of FIGS. 5-6 to match user's hand 206. In this embodiment, FIG. 5 may illustrate a determination that gesture 918 meets the predetermined threshold for expected gesture 1006 but may require rotation of base model 502 to the position in FIG. 6 to fully match user's hand 206 within the predetermined threshold.

Returning to FIG. 1, at step 130, one or more of the systems described herein may identify a targeted area of the image containing a portion of a finger of the user's hand based on the set of key points and the gesture. For example, an identification module 906 may, as part of augmented-reality system 200 in FIG. 9, identify a targeted area 600 of image 208 containing a portion 604 of a finger of user's hand 206 based on set of key points 402 and gesture 918.

The systems described herein may perform step 130 in a variety of ways. In one embodiment, identification module 906 may identify targeted area 600 based on an expected augmented-reality object to display and the general expected location for displaying the augmented-reality object. For example, as illustrated in FIG. 6, targeted area 600 may capture portion 604 of a finger 602 based on the user trying on wedding rings that are typically worn on the ring finger. In this example, identification module 906 may identify targeted area 600 based on the key points of finger 602. Additionally, key points of adjacent fingers may be included to improve the identification of targeted area 600. For example, identification module 906 may use the middle finger and the pinky finger of user's hand 206 to stabilize and/or anchor the location of finger 602. In other examples, the user may select targeted area 600, such as by touching visual display 204 to select an area of image 208. By identifying targeted area 600, identification module 906 may pinpoint an important portion of image 208 for more precise image processing.

Returning to FIG. 1, at step 140, one or more of the systems described herein may detect a pair of edge contours of the finger by performing a computer vision method on the targeted area of the image. For example, a detection module 908 may, as part of augmented-reality system 200 in FIG. 9, detect a pair of edge contours 704 by performing a computer vision method 920 on targeted area 600 of image 208.

The systems described herein may perform step 140 in a variety of ways. In some embodiments, the term "computer vision" may refer to a method of analyzing digital images and/or video to extract important information and recognize objects. Examples of computer vision methods may include optical flow, contour matching, pattern recognition, and/or any other suitable method for detecting structures in images. In one embodiment, detection module 908 may run vertical edge detection to determine the contours of finger 602. For example, detection module 908 may detect pair of edge contours 704 of finger 602 by distinguishing between finger 602 and background constructs in targeted area 600 of image 208 and applying predetermined parameters to fit pair of edge contours 704 around finger 602 in targeted area 600.

Figure 7:
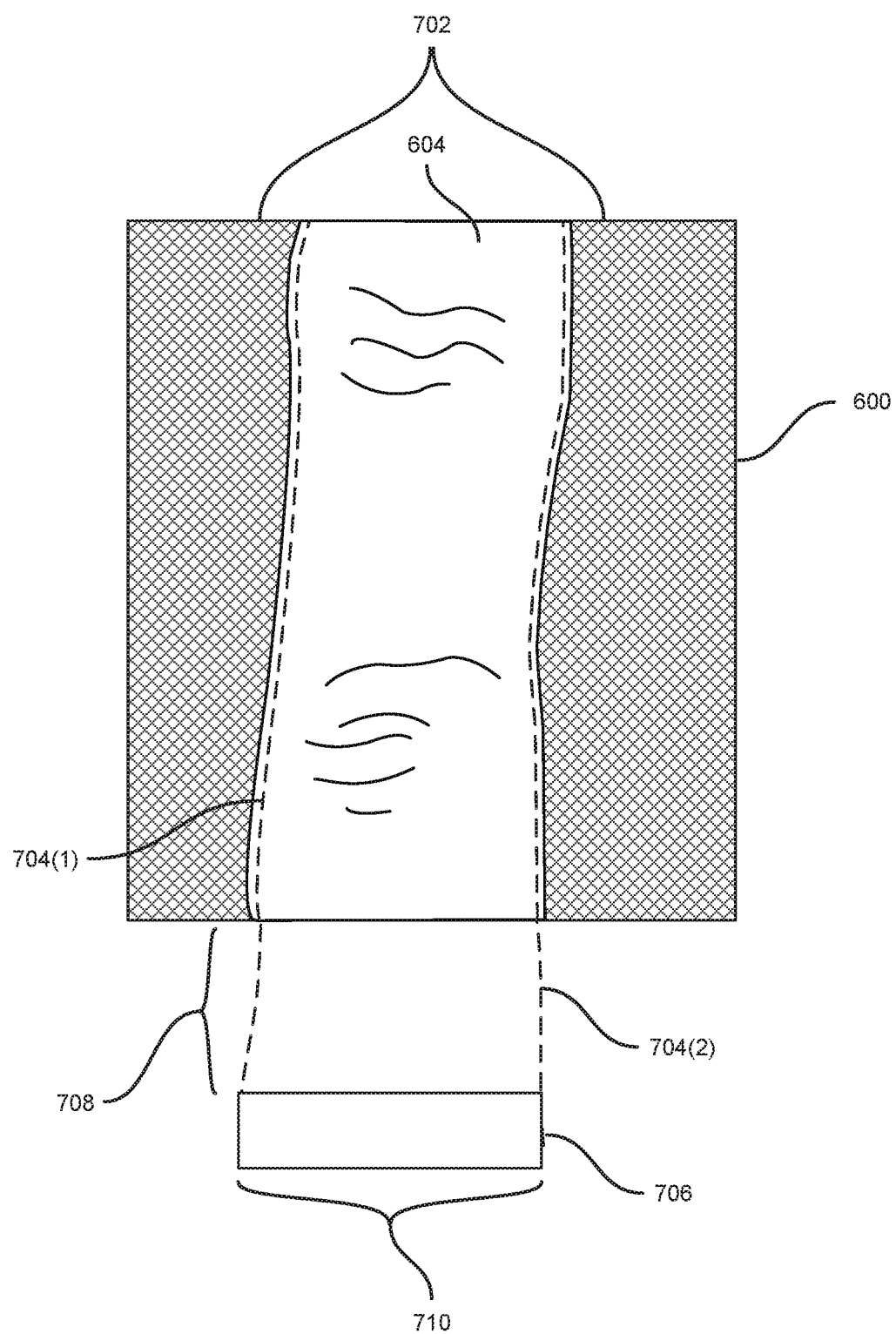
FIG. 7 illustrates an exemplary computer vision method to extrapolate an exemplary location to place an augmented-reality object.

As illustrated in FIG. 7, detection module 908 may detect background constructs 702 and portion 604 of finger 602 captured within targeted area 600. For example, detection module 908 may determine that portion 604 includes pixels in a different range of colors compared to pixels of background constructs 702 and, subsequently, identify pair of edge contours 704(1) and 704(2). In this example, detection module 908 may specifically identify pixel colors within a range of flesh tones to define portion 604. In another example, detection module 908 may calculate statistical models to differentiate between pixels of background constructs 702 and portion 604. In this example, detection module may apply various metrics to maximize the difference between a statistical model of pixels within portion 604 and a separate statistical model of pixels of background constructs 702.

In the above examples, detection module 908 may fit pair of edge contours 704(1) and 704(2) inside the actual contours of portion 604 within a degree of tolerance. In other examples, detection module 908 may prefer to fit pair of edge contours 704(1) and 704(2) outside of the contours of portion 604 within a degree of tolerance to adjust for movement of finger 602 or to permit a looser-fitting augmented-reality object. In additional examples, background constructs 702 may be difficult to separate from portion 604 based on color alone, and detection module 908 may apply additional criteria to determine the likelihood that a detected edge contour is the correct contour of portion 604. Additionally, edge contour 704(1) may be calculated separately from edge contour 704(2), particularly due to differences in lighting, shadows, and/or background constructs behind each edge contour.

Returning to FIG. 1, at step 150, one or more of the systems described herein may extrapolate, from the detected pair of edge contours, a location to place an augmented-reality object on the finger. For example, an extrapolation module 910 may, as part of augmented-reality system 200 in FIG. 9, extrapolate, from detected pair of edge contours 704, a location 706 to place an augmented-reality object 802.

The systems described herein may perform step 150 in a variety of ways. In some examples, extrapolation module 910 may extrapolate location 706 to place augmented-reality object 802 by extrapolating a relative distance of location 706 from pair of edge contours 704 in targeted area 600 of image 208 and by extrapolating a width of finger 602 at location 706. In other words, targeted area 600 may not contain exact location 706 but rather important key points and a visual area to determine pair of edge contours 704. For example, targeted area 600 of FIG. 6 may be fitted around the top two joints of finger 602.

As illustrated in FIG. 7, extrapolation module 910 may then extrapolation previously detected pair of edge contours 704(1) and 704(2) to location 706, which may represent a location the user is expected to wear a wedding ring. In this example, extrapolation module 910 may calculate a relative distance 708 of location 706 from targeted area 600 and a width 710 of finger 602 expected at location 706. In some examples, location 706, relative distance 708, and width 710 may be determined using base model 502 and/or machine learning model 916 to calculate the expected or average values. In additional examples, other fingers, key points, and/or edge contours may be used to extrapolate location 706. Extrapolation module 910 may further calculate details on the orientation of location 706, such as the tilt of finger 602. Similar methods may extrapolate location 706 for other types of augmented-reality objects, such as by extrapolating from user's hand 206 to a location on a wrist to place a virtual bracelet.

Returning to FIG. 1, at step 160, one or more of the systems described herein may display, by the augmented-reality system, the augmented-reality object at the location on the finger by tracking the set of key points of the user's hand. For example, a display module 912 may, as part of augmented-reality system 200 in FIG. 9, display augmented-reality object 802 at location 706 by tracking set of key points 402 of user's hand 206.

The systems described herein may perform step 160 in a variety of ways. In some embodiments, display module 912 may display augmented-reality object 802 at location 706 by matching an orientation of augmented-reality object 802 to an orientation of finger 602 using tracked set of key points 402 and, subsequently, displaying augmented-reality object 802, rotated to match the orientation of finger 602, at location 706. In these embodiments, the orientation of augmented-reality object 802 may include a size of augmented-reality object 802 and/or an angle of augmented-reality object 802.

Figure 8:
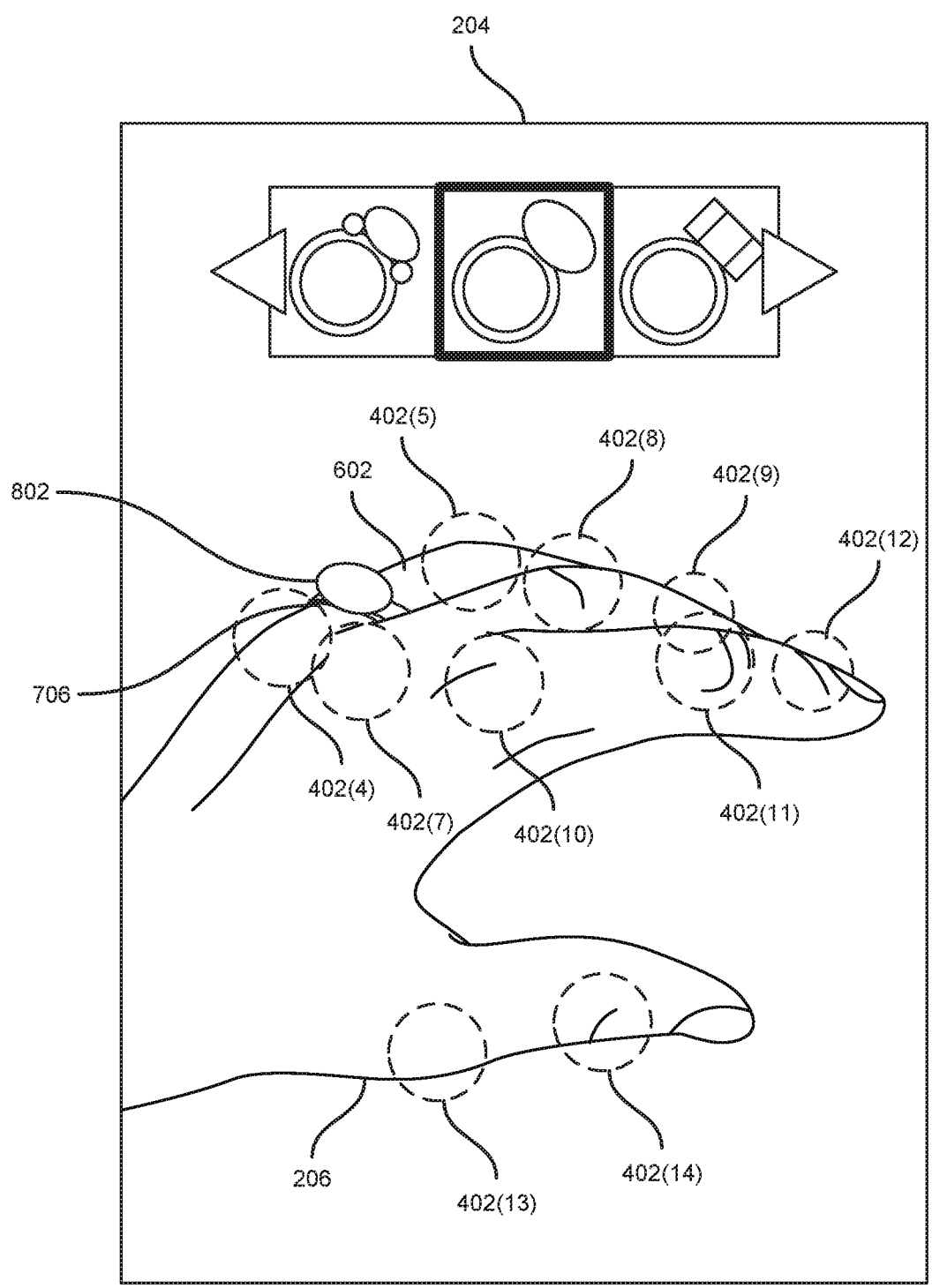
FIG. 8 illustrates an exemplary display of an exemplary augmented-reality object on the user's hand.

As illustrated in FIG. 8, visual display 204 may display augmented-reality object 802 as part of image 208 capturing user's hand 206. In this example, display module 912 may track key points 402(4)-(5), 402(7)-(9), 402(10)-(12), and 402(13)-(14) that are visible in image 208 and place augmented-reality object 802 at location 706 on finger 602 to match the orientation of user's hand 206 and finger 602 determined from set of key points 402. In addition to displaying augmented-reality object 802 at location 706, display module 912 may determine the appropriate size and/or angle of augmented-reality object 802. In some examples, an estimate of the size of augmented-reality object 802 may exceed a minimum or maximum threshold for display and, therefore, may not be displayed on visual display 204. Furthermore, display module 912 may hide a portion or all of augmented-reality object 802 from visual display 204 based on potential occlusion, such as a portion of the band of a ring hidden behind a finger. Additionally, as illustrated in the example of FIG. 8, the user may optionally select which augmented-reality object (i.e., from a menu of multiple rings) to display at location 706.

In one embodiment, display module 912 may display augmented-reality object 802 as part of a video displaying user's hand 206. In this embodiment, display module 912 may display augmented-reality object 802 at location 706 by smoothing a rendering 922 of augmented-reality object 802 to reduce jitter. For example, by tracking set of key points 402 as user's hand 206 moves, display module 912 may fade augmented-reality object 802 in and out of the video in keeping with the movement of user's hand 206.

In some embodiments, user's hand 206 may appear to zoom in or out of the video, such as by moving closer or further to camera 914. In these embodiments, display module 912 may smoothly adjust the size and/or angle of augmented-reality object 802 to reduce video jitter or potential lag in rendering 922 of augmented-reality object 802. In other embodiments, the user may adjust visual display 204 to zoom in or out of image 208 displaying augmented-reality object 802. In these embodiments, rendering 922 of augmented-reality object 802 may adjust the size of augmented-reality object 802 while maintaining the full image data of underlying image 208 to track location 706 on user's hand 206 without losing crucial data needed to accurately determine location 706.

As explained above in connection with method 100 in FIG. 1, the disclosed systems and methods may, by combining machine learning methods and computer vision methods, improve the accuracy of calculating and tracking a location to display an augmented-reality object. Specifically, the disclosed systems and methods may first train a machine learning model on images of hands to create a base model with key points to fit a user's hand. By matching an image of the user's hand to the base model, the systems and methods described herein may identify the key points on the user's hand and determine a gesture of the user's hand.

Additionally, the systems and methods described herein may identify a targeted area of the image using the key points and the gesture to perform a more detailed analysis of the image using computer vision methods. For example, the disclosed systems and methods may detect the edge contours of a finger in the targeted area of the image and extrapolate a location to place the augmented-reality object. The systems and methods described herein may then track the location using the key points on the user's hand, even as the user moves their hand, to determine the orientation of the extrapolated location. Finally, the disclosed systems and methods may display the augmented-reality object at the location by matching the size and orientation of the augmented-reality object to the user's hand, as determined by tracking the key points.

Because machine learning may be robust but slow to adjust to changes in movement while computer vision methods may provide accurate estimates but may not be robust, the combination of machine learning and computer vision methods may reduce errors in tracking and calculating the orientation and movement of the user's hand. Specifically, by using machine learning to first estimate the gesture of the user's hand, the disclosed systems and methods reduce the need to initially provide an accurate tracking of the user's hand. Instead, the computer vision methods may subsequently provide the necessary details for matching the appearance of augmented-reality objects to real-world constructs. The computer vision methods may also be manually tailored to account for known limitations of displaying particular augmented-reality objects and/or tracking particular constructs, which may improve over solely using machine learning methods with more unpredictable design due to limitations of training data. Furthermore, by smoothing potential jitter in continuous displays, the systems and methods described herein may improve the stability of displaying augmented-reality objects. Although described as displaying an augmented-reality object, such as a ring, on a user's hand, the disclosed systems and methods may be used to display other augmented-reality objects on other constructs or body parts. Thus, the systems and methods described herein may improve the accuracy, robustness, and speed of displaying augmented-reality objects.

EXAMPLE EMBODIMENTS

Example 1

A computer-implemented method for displaying augmented-reality objects may include 1) capturing, by one or more cameras of an augmented-reality system, an image of a user's hand, 2) applying a machine learning model to the image of the user's hand to identify a set of key points of the user's hand and to determine a gesture of the user's hand based on the set of key points, 3) identifying a targeted area of the image containing a portion of a finger of the user's hand based on the set of key points and the gesture, 4) detecting a pair of edge contours of the finger by performing a computer vision method on the targeted area of the image, 5) extrapolating, from the detected pair of edge contours, a location to place an augmented-reality object on the finger, and 6) displaying, by the augmented-reality system, the augmented-reality object at the location on the finger by tracking the set of key points of the user's hand.

Example 2

The computer-implemented method of Example 1, wherein the augmented-reality system may include a mobile computing device, the camera, and/or a visual display.

Example 3

The computer-implemented method of any of Examples 1 and 2, wherein the image of the user's hand may include a still image and/or a video.

Example 4

The computer-implemented method of any of Examples 1-3, wherein applying the machine learning model to identify the set of key points may include training the machine learning model using a set of images of hands to create a base model.

Example 5

The computer-implemented method of Example 4, wherein applying the machine learning model to determine the gesture of the user's hand may include rotating the base model to match the user's hand and matching the set of key points to the base model.

Example 6

The computer-implemented method of any of Examples 1-5, wherein applying the machine learning model to the image of the user's hand may include detecting that the gesture of the user's hand does not meet a predetermined threshold for an expected gesture and prompting, by the augmented-reality system, the user to position the user's hand in the expected gesture.

Example 7

The computer-implemented method of any of Examples 1-6, wherein detecting the pair of edge contours of the finger may include distinguishing between the finger and background constructs in the targeted area of the image and applying predetermined parameters to fit the pair of edge contours around the finger in the targeted area of the image.

Example 8

The computer-implemented method of any of Examples 1-7, wherein extrapolating the location to place the augmented-reality object may include extrapolating a relative distance of the location from the pair of edge contours in the targeted area of the image and extrapolating a width of the finger at the location.

Example 9

The computer-implemented method of any of Examples 1-8, wherein displaying the augmented-reality object at the location may include matching an orientation of the augmented-reality object to an orientation of the finger using the tracked set of key points and displaying the augmented-reality object, rotated to match the orientation of the finger, at the location on the finger.

Example 10

The computer-implemented method of Example 9, wherein the orientation of the augmented-reality object may include a size of the augmented-reality object and an angle of the augmented-reality object.

Example 11

The computer-implemented method of any of Examples 1-10, wherein displaying the augmented-reality object at the location may include smoothing a rendering of the augmented-reality object to reduce jitter.

Example 12

A corresponding augmented-reality system for displaying augmented-reality objects may include several modules stored in memory, including 1) a capturing module that captures, by one or more cameras, an image of a user's hand, 2) an application module that applies a machine learning model to the image of the user's hand to identify a set of key points of the user's hand and to determine a gesture of the user's hand based on the set of key points, 3) an identification module that identifies a targeted area of the image containing a portion of a finger of the user's hand based on the set of key points and the gesture, 4) a detection module that detects a pair of edge contours of the finger by performing a computer vision method on the targeted area of the image, 5) an extrapolation module that extrapolates, from the detected pair of edge contours, a location to place an augmented-reality object on the finger, and 6) a display module that displays the augmented-reality object at the location on the finger by tracking the set of key points of the user's hand. The augmented-reality system may also include one or more hardware processors that execute the capturing module, the application module, the identification module, the detection module, the extrapolation module, and the display module.

Example 13

The augmented-reality system of Example 12, wherein the image of the user's hand may include a still image and/or a video.

Example 14

The augmented-reality system of any of Examples 12 and 13, wherein the application module may apply the machine learning model to identify the set of key points by training the machine learning model using a set of images of hands to create a base model.

Example 15

The augmented-reality system of Example 14, wherein the application module may apply the machine learning model to determine the gesture of the user's hand by rotating the base model to match the user's hand and matching the set of key points to the base model.

Example 16

The augmented-reality system of any of Examples 12-15, wherein the application module may apply the machine learning model to the image of the user's hand by detecting that the gesture of the user's hand does not meet a predetermined threshold for an expected gesture and prompting, by the augmented-reality system, the user to position the user's hand in the expected gesture.

Example 17

The augmented-reality system of any of Examples 12-16, wherein the detection module may detect the pair of edge contours of the finger by distinguishing between the finger and background constructs in the targeted area of the image and applying predetermined parameters to fit the pair of edge contours around the finger in the targeted area of the image.

Example 18

The augmented-reality system of any of Examples 12-17, wherein the extrapolation module may extrapolate the location to place the augmented-reality object by extrapolating a relative distance of the location from the pair of edge contours in the targeted area of the image and extrapolating a width of the finger at the location.

Example 19

The augmented-reality system of any of Examples 12-18, wherein the display module may display the augmented-reality object at the location by matching an orientation of the augmented-reality object to an orientation of the finger using the tracked set of key points and displaying the augmented-reality object, rotated to match the orientation of the finger, at the location on the finger.

Example 20

The above-described method may be encoded as computer-readable instructions on a computer-readable medium. For example, a computer-readable medium may include one or more computer-executable instructions that, when executed by at least one processor of a computing device, may cause the computing device to 1) capture, by one or more cameras of an augmented-reality system, an image of a user's hand, 2) apply a machine learning model to the image of the user's hand to identify a set of key points of the user's hand and to determine a gesture of the user's hand based on the set of key points, 3) identify a targeted area of the image containing a portion of a finger of the user's hand based on the set of key points and the gesture, 4) detect a pair of edge contours of the finger by performing a computer vision method on the targeted area of the image, 5) extrapolate, from the detected pair of edge contours, a location to place an augmented-reality object on the finger, and 6) display, by the augmented-reality system, the augmented-reality object at the location on the finger by tracking the set of key points of the user's hand.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data, output a result of the transformation to a visual display, use the result of the transformation to calculate the orientation and location of an augmented-reality object, and store the result of the transformation to an augmented-reality system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   capturing, by at least one camera of an augmented-reality system, an image of a user's hand;
   applying a machine learning model to the image of the user's hand to:
      identify a set of key points of the user's hand; and
      determine a gesture of the user's hand based on the set of key points;
   identifying a targeted area of the image of the user's hand, wherein the targeted area:
      contains a portion of a finger of the user's hand based on the set of key points and the gesture; and
      lacks a location to place an augmented-reality object on the finger;
   detecting a pair of edge contours of the finger by performing a computer vision method on the targeted area of the image, wherein the computer vision method comprises vertical edge detection to separately calculate each edge contour of the pair of edge contours;
   extrapolating, from the detected pair of edge contours, the location to place the augmented-reality object on the finger by extrapolating a relative distance between the location and the targeted area of the image; and
   displaying, by the augmented-reality system, the augmented-reality object at the location on the finger by tracking the set of key points of the user's hand.

2. The method of claim 1, wherein the augmented-reality system comprises at least one of:
   a mobile computing device;
   the camera; or
   a visual display.

3. The method of claim 1, wherein the image of the user's hand comprises at least one of:
   a still image; or
   a video.

4. The method of claim 1, wherein applying the machine learning model to identify the set of key points comprises training the machine learning model using a set of images of hands to create a base model.

5. The method of claim 4, wherein applying the machine learning model to determine the gesture of the user's hand comprises:
   rotating the base model to match the user's hand; and
   matching the set of key points to the base model.

6. The method of claim 1, wherein applying the machine learning model to the image of the user's hand comprises:
   detecting that the gesture of the user's hand does not meet a predetermined threshold for an expected gesture; and
   prompting, by the augmented-reality system, the user to position the user's hand in the expected gesture.

7. The method of claim 1, wherein detecting the pair of edge contours of the finger comprises:
   distinguishing between the finger and background constructs in the targeted area of the image; and
   applying predetermined parameters to fit the pair of edge contours around the finger in the targeted area of the image.

8. The method of claim 1, wherein extrapolating the location to place the augmented-reality object comprises:
   extrapolating the relative distance of the location from the pair of edge contours in the targeted area of the image; and
   extrapolating a width of the finger at the location.

9. The method of claim 1, wherein displaying the augmented-reality object at the location comprises:
   matching an orientation of the augmented-reality object to an orientation of the finger using the tracked set of key points; and displaying the augmented-reality object, rotated to match the orientation of the finger, at the location on the finger.

10. The method of claim 9, wherein the orientation of the augmented-reality object comprises:
   a size of the augmented-reality object; and
   an angle of the augmented-reality object.

11. The method of claim 1, wherein displaying the augmented-reality object at the location comprises smoothing a rendering of the augmented-reality object to reduce jitter.

12. An augmented-reality system comprising:
   a capturing module, stored in memory, that captures, by at least one camera, an image of a user's hand;
   an application module, stored in memory, that applies a machine learning model to the image of the user's hand to:
      identify a set of key points of the user's hand; and
      determine a gesture of the user's hand based on the set of key points;
   an identification module, stored in memory, that identifies a targeted area of the image of the user's hand, wherein the targeted area:
      contains a portion of a finger of the user's hand based on the set of key points and the gesture; and
      lacks a location to place an augmented-reality object on the finger;
   a detection module, stored in memory, that detects a pair of edge contours of the finger by performing a computer vision method on the targeted area of the image, wherein the computer vision method comprises vertical edge detection to separately calculate each edge contour of the pair of edge contours;
   an extrapolation module, stored in memory, that extrapolates, from the detected pair of edge contours, the location to place the augmented-reality object on the finger by extrapolating a relative distance between the location and the targeted area of the image;
   a display module, stored in memory, that displays the augmented-reality object at the location on the finger by tracking the set of key points of the user's hand; and
   at least one hardware processor that executes the capturing module, the application module, the identification module, the detection module, the extrapolation module, and the display module.

13. The augmented-reality system of claim 12, wherein the image of the user's hand comprises at least one of:
   a still image; or
   a video.

14. The augmented-reality system of claim 12, wherein the application module applies the machine learning model to identify the set of key points by training the machine learning model using a set of images of hands to create a base model.

15. The augmented-reality system of claim 14, wherein the application module applies the machine learning model to determine the gesture of the user's hand by:
   rotating the base model to match the user's hand; and
   matching the set of key points to the base model.

16. The augmented-reality system of claim 12, wherein the application module applies the machine learning model to the image of the user's hand by:
   detecting that the gesture of the user's hand does not meet a predetermined threshold for an expected gesture; and
   prompting, by the augmented-reality system, the user to position the user's hand in the expected gesture.

17. The augmented-reality system of claim 12, wherein the detection module detects the pair of edge contours of the finger by:
   distinguishing between the finger and background constructs in the targeted area of the image; and
   applying predetermined parameters to fit the pair of edge contours around the finger in the targeted area of the image.

18. The augmented-reality system of claim 12, wherein the extrapolation module extrapolates the location to place the augmented-reality object by:
   extrapolating the relative distance of the location from the pair of edge contours in the targeted area of the image; and
   extrapolating a width of the finger at the location.

19. The augmented-reality system of claim 12, wherein the display module displays the augmented-reality object at the location by:
   matching an orientation of the augmented-reality object to an orientation of the finger using the tracked set of key points; and
   displaying the augmented-reality object, rotated to match the orientation of the finger, at the location on the finger.

20. A computer-readable medium comprising one or more computer-executable instructions that, when executed by at least one processor of a computing device, cause the computing device to:
   capture, by at least one camera of an augmented-reality system, an image of a user's hand;
   apply a machine learning model to the image of the user's hand to:
      identify a set of key points of the user's hand; and
      determine a gesture of the user's hand based on the set of key points;
   identify a targeted area of the image of the user's hand, wherein the targeted area:
      contains a portion of a finger of the user's hand based on the set of key points and the gesture; and
      lacks a location to place an augmented-reality object on the finger;
   detect a pair of edge contours of the finger by performing a computer vision method on the targeted area of the image, wherein the computer vision method comprises vertical edge detection to separately calculate each edge contour of the pair of edge contours;
   extrapolate, from the detected pair of edge contours, the location to place the augmented-reality object on the finger by extrapolating a relative distance between the location and the targeted area of the image; and
   display, by the augmented-reality system, the augmented-reality object at the location on the finger by tracking the set of key points of the user's hand.

* * * * *